United States Patent
Yang

(10) Patent No.: US 10,664,689 B2
(45) Date of Patent: May 26, 2020

(54) DETERMINING USER ACTIVITY BASED ON EYE MOTION

(71) Applicant: Lenovo (Beijing) Co., Ltd., Beijing (CN)

(72) Inventor: Daye Yang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/587,872

(22) Filed: May 5, 2017

(65) Prior Publication Data

US 2017/0372131 A1 Dec. 28, 2017

(30) Foreign Application Priority Data

Jun. 27, 2016 (CN) .......................... 2016 1 0482953

(51) Int. Cl.
| | | |
|---|---|---|
| G06K 9/00 | (2006.01) | |
| G06Q 10/00 | (2012.01) | |
| G06Q 30/02 | (2012.01) | |
| G06F 3/01 | (2006.01) | |
| G06K 9/46 | (2006.01) | |
| G06T 7/20 | (2017.01) | |

(52) U.S. Cl.
CPC ......... *G06K 9/00335* (2013.01); *G06F 3/013* (2013.01); *G06K 9/0061* (2013.01); *G06K 9/00604* (2013.01); *G06K 9/4676* (2013.01); *G06Q 10/00* (2013.01); *G06Q 30/0201* (2013.01); *G06T 7/20* (2013.01)

(58) Field of Classification Search
CPC .......................... G06F 3/013; G06K 9/00604
See application file for complete search history.

(56) References Cited

U.S. PATENT DOCUMENTS

| | | | | |
|---|---|---|---|---|
| 9,096,920 B1* | 8/2015 | Gomez | ..................... | C23C 4/06 |
| 2008/0172261 A1* | 7/2008 | Albertson | .......... | G06K 9/00335 |
| | | | | 382/103 |
| 2013/0243332 A1 | 9/2013 | Du et al. | | |
| 2014/0184550 A1* | 7/2014 | Hennessey | .............. | G06F 3/013 |
| | | | | 345/173 |
| 2015/0177833 A1* | 6/2015 | Vennstrom | .............. | G06F 3/013 |
| | | | | 345/156 |

(Continued)

FOREIGN PATENT DOCUMENTS

| | | |
|---|---|---|
| CN | 103324287 A | 9/2013 |
| CN | 103500011 A | 1/2014 |

(Continued)

*Primary Examiner* — Oneal R Mistry
(74) *Attorney, Agent, or Firm* — Anova Law Group, PLLC

(57) ABSTRACT

An information processing method is provided. The information processing method includes acquiring a motion state of eyes of a user to form eye motion data and record a first acquisition time of the eye motion data; extracting position data of the user's eyeballs from the eye motion data; and capturing user behavior activity data to record a second acquisition time of the user behavior activity data. The method also includes, based on the first acquisition time and the second acquisition time, determining a correspondence relationship between the position data of the user's eyeballs and the user behavior activity data; and, based on the correspondence relationship and a current eye motion, determining a current user behavior activity.

14 Claims, 3 Drawing Sheets

(56) References Cited

U.S. PATENT DOCUMENTS

2016/0085302 A1* 3/2016 Publicover .............. G06F 21/64
                                                         345/633
2016/0335475 A1* 11/2016 Krenzer ............. G06K 9/00335
2017/0350718 A1* 12/2017 Schulz ................... B60K 35/00

FOREIGN PATENT DOCUMENTS

| CN | 104504390 A | 4/2015 |
| CN | 104750232 A | 7/2015 |

* cited by examiner

DETERMINING USER ACTIVITY BASED ON EYE MOTION

CROSS-REFERENCES TO RELATED APPLICATIONS

This application claims priority of Chinese Patent Application No. 201610482953.5, filed on Jun. 27, 2016, the entire contents of which are hereby incorporated by reference.

FIELD OF THE INVENTION

The present disclosure generally relates to the field of information technology and, more particularly, relates to an information processing method and an electronic device thereof.

BACKGROUND

Human visual behavior has an important potential for human activity cognition and analysis. With the maturing and price reduction of head-mounted eye-tracking software and hardware, as well as the popularity of Augmented Reality (AR) and Virtual Reality (VR) technologies, its applications have rapidly advanced from military and industrial applications in the past to consumer and entertainment applications. The application scenarios are also expanding from relatively fixed places, such as design rooms and laboratories, etc., to places in people's daily lives, and more and more mobile application scenarios emerged, such as games, education, and so on. In the near future, it may be widely used in mobile phones and glasses.

Thus, it can be valuable in the scientific and commercial fields to understand how to use the head-mounted eye-tracking technology to better collect, evaluate, and analyze human behavior, especially to collect certain hidden user status.

However, currently, visual activity information obtained by short-term eye tracking is used to judge user activity, manual classification and management is often required, and the efficiency and accuracy is also low.

The disclosed processor and information processing method thereof are directed to solve one or more problems set forth above and other problems.

BRIEF SUMMARY OF THE DISCLOSURE

A first aspect of the present disclosure is an information processing method. The information processing method includes acquiring a motion state of eyes of a user to form eye motion data and record a first acquisition time of the eye motion data; extracting position data of the user's eyeballs from the eye motion data; and capturing user behavior activity data to record a second acquisition time of the user behavior activity data. The method also includes, based on the first acquisition time and the second acquisition time, determining a correspondence relationship between the position data of the user's eyeballs and the user behavior activity data; and, based on the correspondence relationship and a current eye motion, determining a current user behavior activity.

A second aspect of the present disclosure is an electronic device. The electronic device includes a first collecting unit, an extracting unit, a second collecting unit, and a determining unit. The first collecting unit acquires a motion state of eyes of a user to form eye motion data and record a first acquisition time of the eye motion data; the extracting unit extracts position data of the users eyeballs from the eye motion data; the second collecting unit captures user behavior activity data to record a second acquisition time of the user behavior activity data; and the determining unit determines a correspondence relationship between the position data of the user's eyeballs and the user behavior activity data based on the first acquisition time and the second acquisition time, and determines a current user behavior activity based on the correspondence relationship and a current eye motion.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to certain embodiments of the invention, which are illustrated in the accompanying drawings. Wherever possible, the same reference numbers will be used throughout the drawings to refer to the same or like parts. The described embodiments are some but not all of the embodiments of the present invention. Based on the disclosed embodiments and without inventive efforts, persons of ordinary skill in the art may derive other embodiments consistent with the present disclosure, all of which are within the scope of the present invention.

Figure 5:
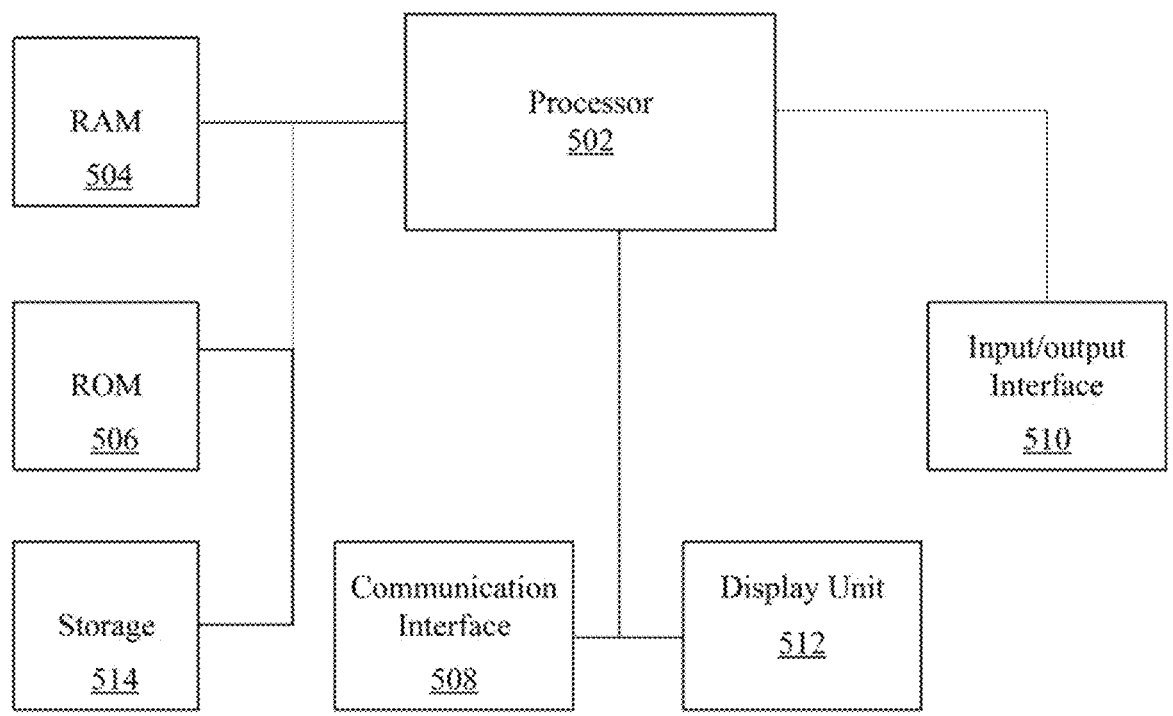
FIG. 5 illustrates an example of an electronic device consistent with disclosed embodiments.

FIG. 5 illustrates a structural diagram of an example of electronic device consistent with disclosed embodiments. The electronic device consistent with the disclosed embodiments may include a variety of personal or wearable computing devices, such as a mobile phone, a glass-type computing device, a tablet computer, or a notebook computer, or any portable, pocket-sized, handheld, head-mounted, wearable, computer built-in, or vehicle mounted mobile device.

As shown in FIG. 5, the electronic device may include a processor 502, a random access memory (RAM) unit 504, a read-only memory (ROM) unit 506, a communication interface 508, an input/output interface unit 510, a display unit 512, and a storage unit 514. Other components may be added and certain devices may be removed without departing from the principles of the disclosed embodiments.

Processor 502 may include any appropriate type of graphic processing unit (GPU), general purpose microprocessor, digital signal processor (DSP) or microcontroller, and application specific integrated circuit (ASIC). Processor 502 may execute sequences of computer program instructions to perform various processes associated with the electronic device. The computer program instructions may be loaded into RAM 504 for execution by processor 502 from read-only memory 506.

Communication interface 508 may provide communication connections such that the electronic device may be accessed remotely and/or communicate with other systems through computer networks or other communication networks via various communication protocols, such as transmission control protocol/internet protocol (TCP/IP), hypertext transfer protocol (HTTP), etc.

Input/output interface 510 may be provided for users to input information into the electronic device or for the users to receive information from the electronic device. For example, input/output interface 510 may include any appropriate input device, such as a remote control, a keyboard, a mouse, an electronic tablet, voice communication devices, or any other optical or wireless input devices. The input/output interface 510 may also include certain sensors, such as camera(s), eye-trackers, and other types of sensing components to input various user or environmental information to the electronic device for analysis and processing.

Display unit 512 may include any appropriate display screen such as display screen 104. Further, storage unit 514 may include any appropriate type of storage medium, such as a CD-ROM, a hard disk, a flash drive, an optical storage, a DVD drive, or other type of storage devices. During operation of the electronic device, processor 202 may perform certain information processing processes.

Embodiment 1

Figure 1:
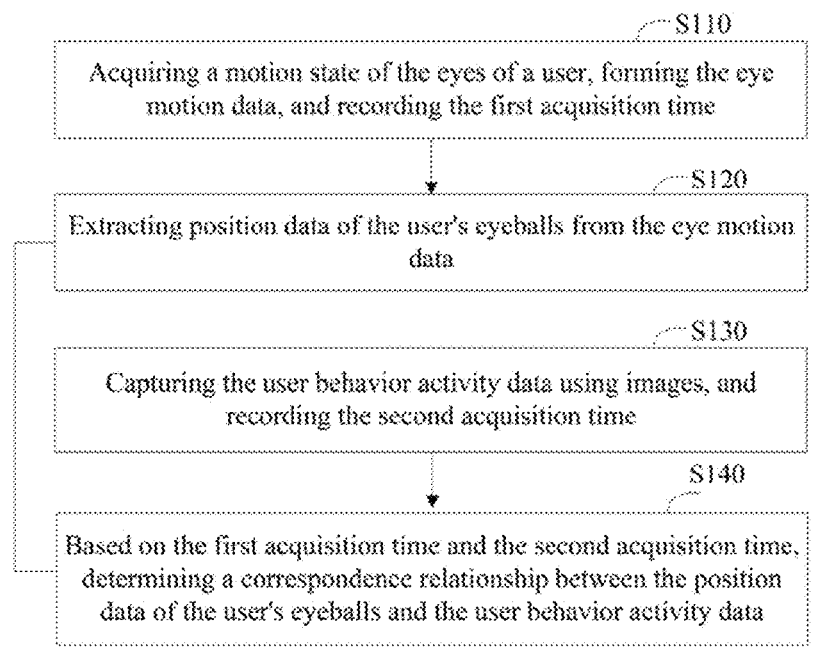
FIG. 1 illustrates a flow chart of an example of an information processing method consistent with the disclosed embodiments.

FIG. 1 illustrates an example of an information processing method consistent with the disclosed embodiments. The information processing method can be applied to various electronic devices, for example, electronic devices capable of collecting user eye motion information, such as an eye tracker. As shown in FIG. 1, the information processing method may include the following steps.

Step S110: acquiring a motion state of the eyes of a user, forming the eye motion data, and recording the first acquisition time.

Step S120: extracting position data of the user's eyeballs from the eye motion data.

Step S130: capturing the user behavior activity data using images, and recording the second acquisition time.

Step S140: based on the first acquisition time and the second acquisition time, determining a correspondence relationship between the position data of the user's eyeballs and the user behavior activity data.

The correspondence relationship can be further used to determine the current user behavior activity based on the motion state of the user's eyes.

In Step S110, the motion state of the eyes may be acquired by images. For example, images of the eyes or eyeballs of the user can be used to acquire the motion state of the eyes of the user. By acquiring the motion state of the user's eyes, it can be determined whether the user's eyeballs remain still, gaze at a certain place, blink, or sweep from one location to another location, etc. Further, the time at which any specific motion state of the eyes occurs is also recorded, as the first acquisition time.

Often, the motion state of the user's eyes can be indicative of the user's mental or physical activity and, thus, related to the user's current activity.

In certain embodiments, to facilitate recording the motion state of the eyes, the position data of the user's eyeballs may be used to record the motion state. By using such position data to record the motion state of user's eyes, it can avoid a large storage capacity caused by recording a large amount of image data and, at the same time, the position data can provide substantially fast data conversion and data extraction, enabling subsequent direct application of the data.

In Step S130, the user behavior activity data may be obtained by images of user behavior activity. The user behavior activity data is the data of the user behavior activities other than the eye motion state. The acquisition time of various user behavior activity data is recorded as the second acquisition time. In the present embodiment, both the eye motion data and the user behavior activity data can be acquired in real time, and the first acquisition time and the second acquisition time correspond to the time in which the activity of the user's eyes and the user's behavior activity, respectively.

In Step S140, based on the first acquisition time and the second acquisition time, the motion state of the user's eyes is matched with the user behavior activity. Specifically, the position data and the user behavior activity data are associated with each other. For example, by collecting the motion state of the user's eyes at the time of eating meals, as well as the position data of the user at the time of eating meals, and simultaneously collecting the user behavior activity of eating meal, the subsequent correspondence relationship can be established. For example, the first acquisition time and the second acquisition time is matched and, at the same acquisition time, the position data is corresponding to the user behavior activity data. Subsequently, based on such correspondence relationship, it is possible to know what the user wants to do or is currently doing by observing the motion state of the user's eyeballs. Thus, using the electronic device to automatically establish the above relationship, the accuracy and efficiency of user behavior activity analysis can be substantially improved.

It should be noted that the user behavior activity data may be based on motion state of the user's body other than the user's eyes, and collected from the acquired images, which may have a small amount of data and may be convenient for storage and management.

Embodiment 2

As shown in FIG. 1, the information processing method may include the following steps.

Step S110: acquiring the motion state of the eyes of a user, forming the eye motion data, and recording the first acquisition time.

Step S120: extracting position data of the user's eyeballs from the eye motion data.

Step S130: capturing the user behavior activity data using images, and recording the second acquisition time.

Step S140: based on the first acquisition time and the second acquisition time, determining a correspondence relationship between the position data of the user's eyeballs and the user behavior activity data.

The correspondence relationship can be further used to determine the current user behavior activity based on the motion state of the user's eyes.

Further, the information processing method may also include: encoding the position data of the eyes of the user to form a coding sequence. The step S140 may include: determining a correspondence relationship between the coding sequence and the user behavior activity data.

Specifically, to facilitate recording the position data, the position data is encoded using a preset coding rule to form a coding sequence.

For example, first, an area in which the eyes of the user can be movable, e.g., a region within a user's eyes, also called a view field, is divided into a plurality of regions. Second, a region identifier of a region to which the user's eyes moved is recorded and combined with an action identifier of the eyes' movement and a state identifier to form the coding sequence.

For example, when the eyes of a user stare, the region identifier of the region where the eyeballs are located is recorded, and the length of the staring time is digitally recorded. Further, an action identifier indicating the staring is added. Thus, a staring code of the user's eyes is recorded. For example, provided that N represents the action identifier of staring, and the user's view field is divided into four regions in the Cartesian coordinate system with the center point as the origin, into 1, 2, 3, and 4, in a counterclockwise direction, when the user's eyeballs stare at the first region for 2 seconds, the corresponding code can be N12. That is, N indicates the action identifier, 1 indicates the region identifier, and 2 indicates the state identifier, i.e., the time length being 2 seconds. Of course, when partitioning or dividing the view field, in addition to the Cartesian coordinate system, a circular coordinate system can also be used to divide the view field into fan-shaped regions based on angles, for example, one region per 60 degrees.

Also for example, when the user's eyes blink, the number of blinks of the user's eyes can be determined, and the state identifier can then be determined. Further, an action identifier indicating the blink of eyes can be added to form the code for the number of blinks of the user's eyes. Of course, it is also possible to combine the region identifiers of the region where the eyeball is located when the user blinks.

Also for example, when the user's eyes are sweeping from one location to another location, the positions of the user's eyeballs from one location to another location can be recorded, and the region identifiers corresponding to the two locations can also recorded, combined with the action identifier for the sweeping action, to form the code for the sweeping of the user eyes.

Accordingly, in the present embodiment, the motion identifier combined with at least one of the region identifier and the state identifier can be encoded to form the coding sequence. After the position data is converted into the coding sequence, the data is easy to be stored and managed, and also convenient for subsequent processing, which is equivalent to providing a standardized and unified data records.

Thus, in the present embodiment, the correspondence relationship between the position data and the user behavior activity data is the correspondence relationship between the established coding sequence and the user behavior activity data. For example, when the user is driving, the motion state of the user's eyes while driving can be used to form the coding to sequence, and the 'driving' keyword can be stored through the user behavior activity data records. Thus, the correspondence relationship between the coding sequence and the 'driving' keyword can be established. Subsequently, the motion state of the user's eyes can be collected using an eye-tracker or other eye motion acquisition devices, such as VR or AR smart glasses, and the coding sequence can be established. Based on the correspondence relationship above, it can be determined that the user is driving.

Embodiment 3

As shown in FIG. 1, the information processing method may include the following steps.

Step S110: acquiring the motion state of the eyes of a user, forming the eye motion data, and recording the first acquisition time.

Step S120: extracting position data of the user's eyeballs from the eye motion data.

Step S130: capturing the user behavior activity data using images, and recording the second acquisition time.

Step S140: based on the first acquisition time and the second acquisition time, determining a correspondence relationship between the position data of the user's eyeballs and the user behavior activity data.

The correspondence relationship can be further used to determine the current user behavior activity based on the motion state of the user's eyes.

Further, the information processing method may also include: encoding the position data of the eyes of the user to form a coding sequence. The Step S140 may include: determining a correspondence relationship between the coding sequence and the user behavior activity data.

Specifically, to facilitate recording the position data, the position data is encoded using a preset coding rule to form a coding sequence.

The Step S140 may include: determining a correspondence relationship between the coding sequence and the user behavior activity data.

The step S140 may further include: using a sliding window to divide the coding sequence to form bag-of-words (BoW) data; using the bag-of-words data as a data processing unit to determine a preset coding term in each sliding window; and establishing a correspondence relationship between the preset coding terms and the user behavior activity data.

The eye motion data of the user is encoded to obtain a plurality of coding sequences. Specifically, to determine which eye motion corresponds to a user behavior activity as a whole, a sliding window method is used to divide the coding sequence, such that parts of the coding sequence corresponding to one or more eye motions are put into one bag-of-words. The data belonging to the same bag-of-words is used as one basic processing unit to subsequently establish the correspondence relationship between the preset coding term and the user behavior activity data, i.e., the correspondence relationship of the basic data processing unit. That is, all the coding sequences within one bag-of-words in its entirety correspond to one user behavior activity data or user behavior activity.

Using the sliding window in the bag-of-words model to divide the coding sequence, the accuracy for establishing the subsequent correspondence relationship may be improved. The window length of the sliding window may correspond to a positive multiple of the length of one coding sequence. The window length may be determined from numerical relationships in the correspondence relationship between the coding sequence and the user behavior activity data in the history record. For example, based on the history record, if M number of coding sequences correspond to one user behavior activity data, the window length may be the length of the M number of coding sequences. At this time, the sliding window may be an encoding length window, other sliding window can also be used.

Embodiment 4

As shown in FIG. 1, the information processing method may include the following steps.

Step S110: acquiring the motion state of the eyes of a user, forming the eye motion data, and recording the first acquisition time.

Step S120: extracting position data of the user's eyeballs from the eye motion data.

Step S130: capturing the user behavior activity data using images, and recording the second acquisition time.

Step S140: based on the first acquisition time and the second acquisition time, determining a correspondence relationship between the position data of the user's eyeballs and the user behavior activity data.

The correspondence relationship can be further used to determine the current user behavior activity based on the motion state of the user's eyes.

Further, the information processing method may also include: encoding the position data of the eyes of the user to form a coding sequence. The Step S140 may include: determining a correspondence relationship between the coding sequence and the user behavior activity data.

Specifically, to facilitate recording the position data, the position data is encoded using a preset coding rule to form a coding sequence. The Step S140 may include: determining a correspondence relationship between the coding sequence and the user behavior activity data.

The step S140 may further include: using a sliding window to divide the coding sequence to form bag-of-words data; using the work pocket data as a data processing unit to determine a preset coding term in each sliding window; and establishing a correspondence relationship between the preset coding terms and the user behavior activity data.

Further, the information processing method may further include: analyzing the user behavior activity data, and using different user behavior activities as basis for dividing the encoding sequences to determine the sliding window in the time dimension.

In the present embodiment, the sliding window may be a time sliding window in the time dimension, and one sliding window corresponds to a specific time period. For example, the coding sequence is sequentially sorted in a chronological order from the earliest time to the latest time, and the time sliding window may correspond to P seconds. Thus, the sliding window contains all coding sequences within P seconds. Further, when recording the user behavior activity data, the transition time point from one behavior activity to another behavior activity of the user is recorded. Based on these transition time points, the length of the time sliding window can be determined. By determining the time sliding window, it is equivalent to determining the number of coding sequences included in each of the bag-of-words, so that the above-described correspondence can be accurately established.

The preset coding terms in this embodiment may be one or more coding sequences arranged according to a preset rule.

Embodiment 5

As shown in FIG. 1, the information processing method may include the following steps.

Step S110: acquiring the motion state of the eyes of a user, forming the eye motion data, and recording the first acquisition time.

Step S120: extracting position data of the user's eyeballs from the eye motion data.

Step S130: capturing the user behavior activity data using images, and recording the second acquisition time.

Step S140: based on the first acquisition time and the second acquisition time, determining a correspondence relationship between the position data of the user's eyeballs and the user behavior activity data.

The correspondence relationship can be further used to determine the current user behavior activity based on the motion state of the user's eyes.

Further, the information processing method may also include: encoding the position data of the eyes of the user to form a coding sequence. The Step S140 may include: determining a correspondence relationship between the coding sequence and the user behavior activity data.

Specifically, to facilitate recording the position data, the position data is encoded using a preset coding rule to form a coding sequence. The Step S140 may include: determining a correspondence relationship between the coding sequence and the user behavior activity data.

The step S140 may further include: using a sliding window to divide the coding sequence to form bag-of-words data; using the work pocket data as a data processing unit to determine a preset coding term in each sliding window; and establishing a correspondence relationship between the preset coding terms and the user behavior activity data.

The bag-of-words data can be used as a data processing unit, and the preset coding terms in each of the sliding windows can be determined. Specifically, the occurrence frequency of each coding sequence in each bag-of-words is counted, as well as the correspondence between any two coding sequences. Based on the occurrence frequency and the correspondence, the preset coding terms can be determined.

For example, what eye motions are likely to occur when a user is reading a book, and which eye motions are most frequently occurring, these eye motions are clearly associated with the reading activity. Thus, the frequency information of the coding sequences in a bag-of-words can be counted, and the one or more coding sequences with higher frequencies are selected to correspond with the user behavior activity of "reading".

Of course, the eye motion of the user is continuous, and there is an association relationship between two eye motions. Thus, the probability that the two eye motions always occur adjacently and/or in the preset interval is also counted. For example, at the time of reading a book, what is the relationship between a glance and a blink and what is the relationship between a sweep and a gaze can be represented by the association relationship between the coding sequences described above. By extracting the association relationship, a correspondence relationship can be established between a combination of the user's eye motions and the user behavior activity data. Accordingly, in the present embodiment, the preset coding term can be determined based on the frequency information and the correspondence relationship.

The preset coding term may be one or more of the coding sequences arranged according to a preset rule. For example, the preset coding term may include two parts. The first part is a high frequency coding sequence, S1 number of coding sequences with the highest frequency information, and the frequency information is sorted from high to low.

The second part is the correspondence relationship among the coding sequences. Two coding sequences with a correspondence relationship may be recorded to form a combined code. The two coding sequences within a combined code represent an association of eye motions corresponding to the two coding sequences. In order to accurately represent the parameters such as the relevance degree of the correspondence, a correspondence probability and an interval sequence number, etc., are also introduced. For example, the correspondence probability may be a probability that the eye motions corresponding to the two coding sequences always occur together. The interval sequence number may be the average interval in the number of the coding sequences or the number of interval coding sequences with the highest frequency when the two coding sequences occur together.

Of course, other arrangements for the preset coding terms may also be used. In the present embodiment, by using the frequency information and the correspondence relationship to determine the preset coding terms, the correspondence relationship between the user's eye motions and the physical activities of the other parts of the user is established in at least two dimensions, having a higher accuracy.

Figure 2:
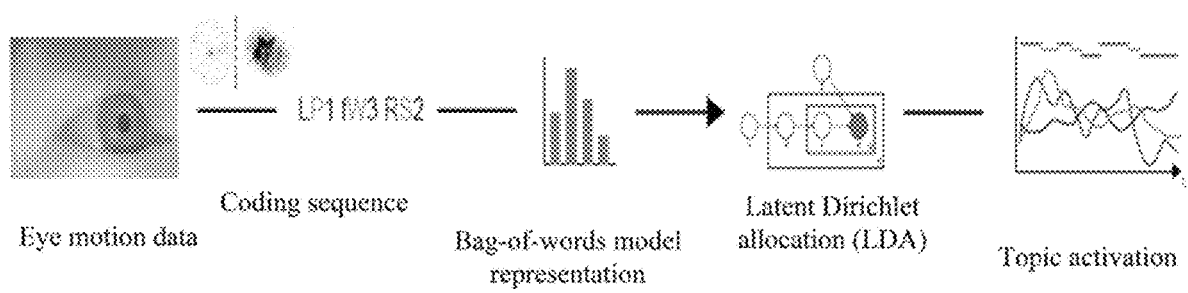
FIG. 2 illustrates a flow chart of another example of an information processing method consistent with the disclosed embodiments.

For example, as shown in FIG. 2, the eye motion data is first collected and then encoded, the bag-of-words model is used to represent and establish the correspondence relationship, and also by the latent Dirichlet allocation (LDA) model. Then, the subsequent eye motion data is scanned and the correspondence relationship is activated based on topics.

Embodiment 6

Figure 3:
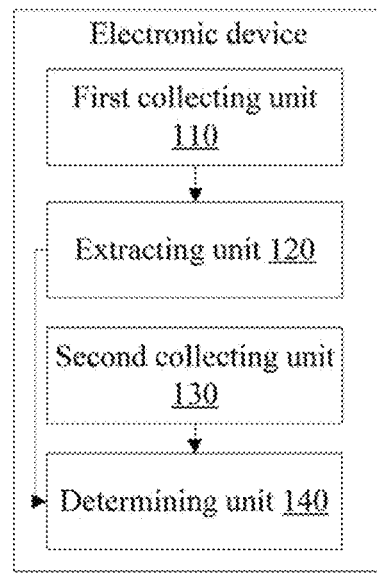
FIG. 3 illustrates a structural diagram of an example of an electronic device consistent with disclosed embodiments.
Figure 4:
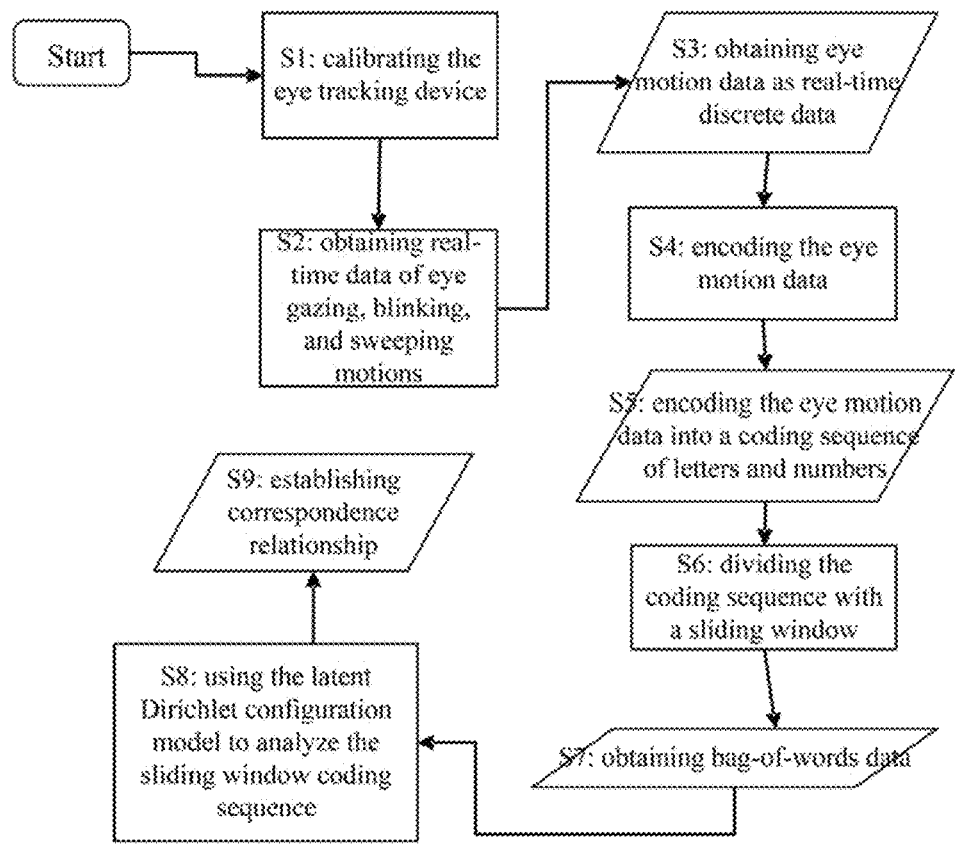
FIG. 4 illustrates a flow chart of another example of an information processing method consistent with the disclosed embodiments.

As shown in FIG. 3, an electronic device may be provided, and the electronic device may include a first collecting unit 110, an extracting unit 120, a second collecting unit 130, and a determining unit 140, etc.

The first collecting unit 110 may acquire the motion state of the eyes of a user, forming the eye motion data, and record the first acquisition time. The extracting unit 120 may extract position data of the user's eyeballs from the eye motion data. The second collecting unit 130 may capture the user behavior activity data using images, and record the second acquisition time. Further, the determining unit 140 may, based on the first acquisition time and the second acquisition time, determine a correspondence relationship between the position data of the user's eyeballs and the user behavior activity data.

The correspondence relationship can be further used to determine the current user behavior activity based on the motion state of the user's eyes.

The electronic device may include any device that can perform image acquisition, and the first collecting unit 110 and the second collecting unit 130 may correspond to a camera or a video camera capable of image acquisition.

The extraction unit 120 and the determination unit 140 may correspond to a processor or a processing circuit. The processor may be a central processing unit (CPU), a microprocessor, a digital signal processor, an application processor or a field programmable gate array (FPGA), etc. The processing circuit may include an application specific integrated circuit connected to the camera or camera and capable of extraction of position data and establishing the correspondence relationships via execution of predetermined instructions, with simple implementation, high efficiency, and high accuracy, etc.

Embodiment 7

As shown in FIG. 3, an electronic device may be provided, and the electronic device may include a first collecting unit 110, an extracting unit 120, a second collecting unit 130, and a determining unit 140, etc.

The first collecting unit 110 may acquire the motion state of the eyes of a user, forming the eye motion data, and record the first acquisition time. The extracting unit 120 may extract position data of the user's eyeballs from the eye motion data. The second collecting unit 130 may capture the user behavior activity data using images, and record the second acquisition time. Further, the determining unit 140 may, based on the first acquisition time and the second acquisition time, determine a correspondence relationship between the position data of the user's eyeballs and the user behavior activity data.

The correspondence relationship can be further used to determine the current user behavior activity based on the motion state of the user's eyes.

The electronic device may further include an encoding unit (not shown). The encoding unit encodes the position data of the eyes of the user to form a coding sequence. The determining unit 140 may determine a correspondence relationship between the coding sequence and the user behavior activity data.

The encoding unit may also correspond to the processor or the processing circuit. To facilitate subsequent data processing, the position data is not only extracted, but also encoded to form coding sequences using a preset coding rule. Thus, the determining unit 140 may establish the correspondence relationship between the coding sequence and the user behavior activity data.

Embodiment 8

As shown in FIG. 3, an electronic device may be provided, and the electronic device may include a first collecting unit 110, an extracting unit 120, a second collecting unit 130, and a determining unit 140, etc.

The first collecting unit 110 may acquire the motion state of the eyes of a user, forming the eye motion data, and record the first acquisition time. The extracting unit 120 may extract position data of the user's eyeballs from the eye motion data. The second collecting unit 130 may capture the user behavior activity data using images, and record the second acquisition time. Further, the determining unit 140 may, based on the first acquisition time and the second acquisition time, determine a correspondence relationship between the position data of the user's eyeballs and the user behavior activity data.

The correspondence relationship can be further used to determine the current user behavior activity based on the motion state of the user's eyes.

The electronic device may further include an encoding unit (not shown). The encoding unit encodes the position data of the eyes of the user to form a coding sequence. The determining unit 140 may determine a correspondence relationship between the coding sequence and the user behavior activity data.

Further, the determining unit 140 may use a sliding window to divide the coding sequence to form bag-of-words data; using the work pocket data as a data processing unit to determine a preset coding term in each sliding window; and may establish a correspondence relationship between the preset coding term and the user behavior activity data.

Accordingly, by using the sliding window to form the bag-of-words, to determine the preset coding term, and to establish the correspondence relationship between the preset coding terms and the user behavior activity data, a simple implementation of the determining unit may be realized.

Embodiment 9

As shown in FIG. 3, an electronic device may be provided, and the electronic device may include a first collecting unit 110, an extracting unit 120, a second collecting unit 130, and a determining unit 140, etc.

The first collecting unit 110 may acquire the motion state of the eyes of a user, forming the eye motion data, and record the first acquisition time. The extracting unit 120 may extract position data of the user's eyeballs from the eye motion data. The second collecting unit 130 may capture the user behavior activity data using images, and record the second acquisition time. Further, the determining unit 140 may, based on the first acquisition time and the second acquisition time, determine a correspondence relationship between the position data of the user's eyeballs and the user behavior activity data.

The correspondence relationship can be further used to determine the current user behavior activity based on the motion state of the user's eyes.

The electronic device may further include an encoding unit (not shown). The encoding unit encodes the position data of the eyes of the user to form a coding sequence. The determining unit 140 may determine a correspondence relationship between the coding sequence and the user behavior activity data.

Further, the determining unit 140 may use a sliding window to divide the coding sequence to form bag-of-words data; using the work pocket data as a data processing unit to determine a preset coding term in each sliding window; and may establish a correspondence relationship between the preset coding term and the user behavior activity data.

The electronic device may further include an analyzing unit (not shown). The analyzing unit may analyze the user behavior activity data, and use different user behavior activities as basis for dividing the encoding sequences to determine the sliding window in the time dimension.

The analyzing unit may also correspond to the processor or the processing circuit. By using the time sliding window to dividing the coding sequences, the correspondence relationship can be accurately established.

Embodiment 10

As shown in FIG. 3, an electronic device may be provided, and the electronic device may include a first collecting unit 110, an extracting unit 120, a second collecting unit 130, and a determining unit 140, etc.

The first collecting unit 110 may acquire the motion state of the eyes of a user, forming the eye motion data, and record the first acquisition time. The extracting unit 120 may extract position data of the user's eyeballs from the eye motion data. The second collecting unit 130 may capture the user behavior activity data using images, and record the second acquisition time. Further, the determining unit 140 may, based on the first acquisition time and the second acquisition time, determine a correspondence relationship between the position data of the user's eyeballs and the user behavior activity data.

The correspondence relationship can be further used to determine the current user behavior activity based on the motion state of the user's eyes.

The electronic device may further include an encoding unit (not shown). The encoding unit encodes the position data of the eyes of the user to form a coding sequence. The determining unit 140 may determine a correspondence relationship between the coding sequence and the user behavior activity data.

Further, the determining unit 140 may count the occurrence frequency of each coding sequence in each bag-of-words, as well as the correspondence between any two coding sequences. Based on the occurrence frequency and the correspondence, the preset coding terms can be determined.

Accordingly, the occurrence frequency information of each coding sequence in each bag-of-words and the correspondence relationship between any two coding sequences are used to determine the preset coding terms. The preset coding terms determine information of at least two dimensions of the frequency information and the occurrence correspondence, the motion state of the user's eyes can be more accurately represented, and the correspondence relationship is more accurate.

Several specific examples or usage scenarios may be provided below to illustrate the various disclosed embodiments.

Scenario 1

By using an eye tracking device, changes in eye motion data (e.g., gazing, blinking, glancing) may be obtained over an extended period of time (e.g., several hours) and, thus, discrete time data is obtained. The position data of the eyeballs may also be obtained, and the position data (e.g., gazing, blinking, glancing) may be encoded.

Further, by combining the bag-of-words (BoW) visual behavioral expression model and the latent Dirichlet allocation (LDA) topic model, the user's daily activities, such as: eating, reading, and driving, etc., may be obtained. That is, the bag-of-words visual behavioral expression model and the latent Dirichlet allocation topic model are used as one scheme to analyze the user behavior activities to obtain the user behavior activity data and, together with encoding, to establish the correspondence relationship.

Scenario 2

An information processing method is provided. The information processing method may include using an eye tracking device to collect, over a long time period (e.g., a few hours), the eye position coordinates to obtain time discrete data of the user's gazing points, blinking, and sweeping motions; and encoding such eye motion data.

Specifically, (1) applying the K-Means algorithm on the sweeping data (direction, speed) to obtain K number of clusters, and each cluster is represented by a code; (2) the gazing data is encoded according to the time length. For example, the upper and lower limits can be determined by the longest and shortest time, and the time length can be equally divided into N number of gazing intervals, represented by N number of codes; and (3) the blinking data (number of times) with the gazing intervals is directly encoded and appended to the gazing data to form coding sequences.

Further, according to the information processing method, the coding sequences can be divided using a sliding window to obtain the bag-of-words data, and the currently active activity can be selected using the latent Dirichlet allocation (LDA) model. Thus, the user's behavior activity can be determined.

Scenario 3

Another information processing method is provided. The information processing method may include the following steps.

S1: calibrating the eye tracking device.

S2: obtaining real-time data of eye gazing, blinking, and sweeping motions.

S3: obtaining eye motion data as real-time discrete data.

S4: encoding the eye motion data.

S5: encoding the eye motion data into a coding sequence of letters and numbers.

S6: dividing the coding sequence with a sliding window.

S7: obtaining bag-of-words data.

S8: using the latent Dirichlet configuration model to analyze the sliding window coding sequence.

S9: establishing correspondence relationship.

It should also be understood that, in the various embodiments, the disclosed methods and devices may be implemented in other ways. The devices described above are merely illustrative. For example, the division of the units/modules is only one logical function division. In actual implementation, there may be an additional division ways. For example, multiple units or components may be combined, or can be integrated into another system, or some features can be ignored, or not implemented. In addition, the coupling, direct coupling, or communication connection of the components shown or discussed with respect to each other may be indirect coupling or communication connection through some interface, device or unit, and may be electrical, mechanical, or other forms.

The elements described above as separate components may or may not be physically separated, and the elements displayed as units may or may not be physical units. That is, they may be located in one place or distributed over a plurality of network units; and some or all of the units may be selected according to actual needs.

Further, the functional units in the various embodiments may all be integrated in one processing module, each unit may be separately provided as one unit, or two or more units may be integrated in one unit. The integrated unit may be implemented in hardware or a combination of hardware and software.

Those skilled in the art can understand that all or part of the steps can be implemented by program instructions on related hardware, and the program instructions may be stored in a computer-readable storage medium. When executed, the program instructions can realize the steps in the various embodiments. The computer-readable storage medium may include removable storage devices, read-only memory (ROM), random access memory (RAM), magnetic disks, or optical disk, etc., or any appropriate medium suitable for storing the program instructions.

Although the foregoing is detailed description of the present disclosure with reference to specific embodiments, it should be understood that the present disclosure is not limited to the embodiments disclosed. For those skilled in the art, various modifications, alterations, and replacements can be made without departing from the spirit of the present invention, and shall all fall within the scope of the present disclosure according to claims.

What is claimed is:

1. A method, comprising:
    processing, by a processor, images of eyes of a user to obtain eye motion data about motion stares of the eyes of the user;
    extracting, by the processor, position data of user's eyeballs from the eye motion data;
    encoding, by the processor, the position data of the user's eyeballs to obtain coding sequences each following a preset coding rule and including a sequence of codes representing various information regarding positions of the user's eyeballs;
    processing, by the processor, images of a body of the user to obtain user behavior activity data, the user behavior activity data indicating behavior activities of the user and being based on motion states of the body of the user other than the eyes of the user;
    correlating, by the processor, the coding sequences to the user behavior activity data to obtain a correspondence relationship;
    combining two of the coding sequences that have an association of the motion states of the eyes with the correspondence relationship;
    recording a correspondence probability and an interval sequence number of the correspondence relationship, wherein the correspondence probability is a probability that the motion states of the eyes corresponding to the two of the coding sequences occur together, and the interval sequence number of the correspondence relationship is an average interval number of coding sequences between the two of the coding sequences or a number of interval coding sequences with a highest frequency when the two of the coding sequences occur together; and
    based on the correspondence relationship and a current eye motion, determining, by the processor, a current user behavior activity.

2. The method according to claim 1, wherein:
    each of the coding sequences includes an action identifier indicating an action of the eyes of the user, a view region identifier indicating a region from a divided vision field of the user, and a state identifier indicating a time length.

3. The method according to claim 2, wherein a vision field within the user's eyes is divided into a plurality of regions and the view region identifier indicates a region at which the user's eyes are located or to which the user's eyes move.

4. The method according to claim 1, wherein correlating the coding sequences to the user behavior activity data further includes:
    dividing the coding sequences into a plurality of data sets each including one or more of the coding sequences corresponding to the position data acquired in a time period;
    arranging the one or more of the coding sequences in one of the data sets according to a preset rule to obtain a preset coding term corresponding to the one of the data sets; and
    establishing a correspondence relationship between the preset coding term and the user behavior activity data.

5. The method according to claim 4, further including:
    analyzing the user behavior activity data to determine different user behavior activities;
    wherein the coding sequences are divided according to the different user behavior activities.

6. The method according to claim 5, wherein:
    different ones of the data sets correspond to different time periods; and
    the coding sequences in each of the data sets are sequentially sorted in a chronological order.

7. The method according to claim 5, wherein the preset coding term corresponding to the one of the data sets is determined based on occurrence frequencies of the coding sequences in the one of the data sets and a correspondence between any two of the coding sequences in the one of the data sets.

8. An electronic device, comprising a processor, and a memory including computer instructions executable by the processor to:
    process images of eyes of a user to obtain eye motion data about motion states of the eyes of the user;
    extract position data of user's eyeballs from the eye motion data;

encode the positional data of the user's eyeballs to obtain coding sequences, each following a preset coding rule and including a sequence of codes representing various information regarding positions of the user's eyeballs;

process images of a body of the user to obtain user behavior activity data, the user behavior activity data indicating behavior activities of the user and being based on motion states of the body of the user other than the eyes of the user;

correlate the coding sequences to the user behavior activity data to obtain a correspondence relationship;

combine two of the coding sequences that have an association of the motion states of the eyes with a correspondence relationship;

record a correspondence probability and an interval sequence number of the correspondence relationship, wherein the correspondence probability is a probability that the motion states of the eyes corresponding to the two of the coding sequences occur together, and the interval sequence number of the correspondence relationship is an average interval number of coding sequences between the two of the coding sequences or a number of interval coding sequences with a highest frequency when the two of the coding sequences occur together; and determine a current user behavior activity based on the correspondence relationship and a current eye motion.

9. The electronic device according to claim 8, wherein:
each of the coding sequences includes an action identifier indicating an action of the eyes of the user, a view region identifier indicating a region from a divided vision field of the user, and a state identifier indicating a time length.

10. The electronic device according to claim 8, wherein the computer instructions are further executed by the processor to:

divide the coding sequences into a plurality of data sets each including one or more of the coding sequences corresponding to the position data acquired in a time period;

arrange the one or more of the coding sequences in one of the data sets according to a preset rule to obtain a preset coding term corresponding to the one of the data sets; and establish a correspondence relationship between the preset coding term and the user behavior activity data.

11. The electronic device according to claim 10, wherein:
the computer instructions are further executable by the processor to analyze the user behavior activity data to determine different user behavior activities; and
the coding sequences are divided according to the different user behavior activities.

12. The electronic device according to claim 11, wherein:
different ones of the data sets correspond to different time periods; and
the coding sequences in each of the data sets are sequentially sorted in a chronological order.

13. The electronic device according to claim 11, wherein the preset coding term corresponding to the one of the data sets is determined based on occurrence frequencies of the coding sequences in the one of the data sets and a correspondence between any two of the coding sequences in the one of the data sets.

14. A method, comprising:
processing, by a processor, images of eyes of a user to obtain eye motion data about motion states of the eyes of the user;

extracting, by the processor, position data of user's eyeballs from the eye motion data;

encoding, by the processor, the position data of the user's eyeballs to obtain coding sequences each following a preset coding rule and including a sequence of codes representing various information regarding positions of the user's eyeballs;

processing, by the processor, images of a body of the user to obtain user behavior activity data, the user behavior activity data indicating behavior activities of the user and being based on motion states of the body of the user other than the eyes of the user;

analyzing the user behavior activity data to determine different user behavior activities, wherein the coding sequences are divided according to the different user behavior activities;

correlating, by the processor, the coding sequences to the user behavior activity data to obtain a correspondence relationship, including:
  dividing the coding sequences into a plurality of data sets each including one or more of the coding sequences corresponding to the position data acquired in a time period;
  arranging the one or more of the coding sequences in one of the data sets according to a preset rule to obtain a preset coding term corresponding to the one of the data sets based on occurrence frequencies of the coding sequences in the one of the data sets and a correspondence between any two of the coding sequences in the one of the data sets; and
  establishing a correspondence relationship between the preset coding term and the user behavior activity data;

combining two of the coding sequences that have an association of the motion states of the eyes with the correspondence relationship;

recording a correspondence probability and an interval sequence number of the correspondence relationship, wherein the correspondence probability is a probability that the motion states of the eyes corresponding to the two of the coding sequences occur together, and the interval sequence number of the correspondence relationship is an average interval number of coding sequences between the two of the coding sequences or a number of interval coding sequences with a highest frequency when the two of the coding sequences occur together; and based on the correspondence relationship and a current eye motion, determining, by the processor, a current user behavior activity.

\* \* \* \* \*